W. H. EARY.
NUT AND BOLT LOCK.
APPLICATION FILED OCT. 4, 1917.

1,278,615.

Patented Sept. 10, 1918.

Witness
Floyd R. Cornwall.

Inventor
William H. Eary
By E. C. Brandenburg
his Attorney

UNITED STATES PATENT OFFICE.

WILLIAM HUNTER EARY, OF FAYETTE, WEST VIRGINIA.

NUT AND BOLT LOCK.

1,278,615.  Specification of Letters Patent.  Patented Sept. 10, 1918.

Application filed October 4, 1917. Serial No. 194,717.

*To all whom it may concern:*

Be it known that I, WILLIAM HUNTER EARY, a citizen of the United States, residing at Fayette, in the county of Fayette and State of West Virginia, have invented certain new and useful Improvements in Nut and Bolt Locks, of which the following is a specification.

My invention relates to bolts and nut locks.

One object of my invention is to provide means for preventing the bolt from turning within the apertures in the rail and fish-plate and to provide means for locking the nut upon the threaded end of the bolt. A further object of my invention is to provide such a locking device which will adapt itself to rails and fish-plates of varying thicknesses and which is reversible as well.

Figure 1:
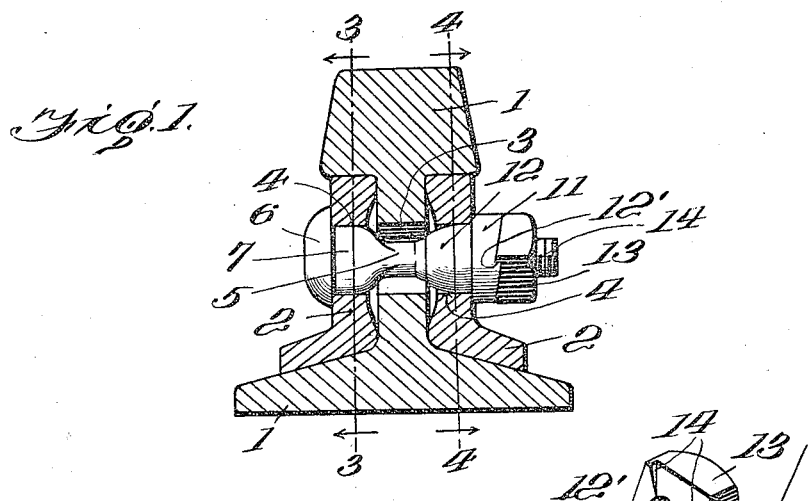

In the accompanying drawings Figure 1 is a vertical cross section through a railway rail and fish-plate showing the device as applied.

Figure 2:
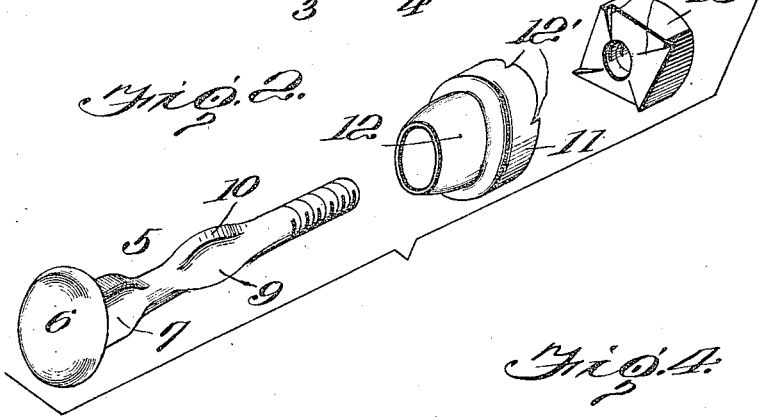

Fig. 2 is a disassembled perspective view of the bolt, lock washer and nut.

Figures 3, 4:
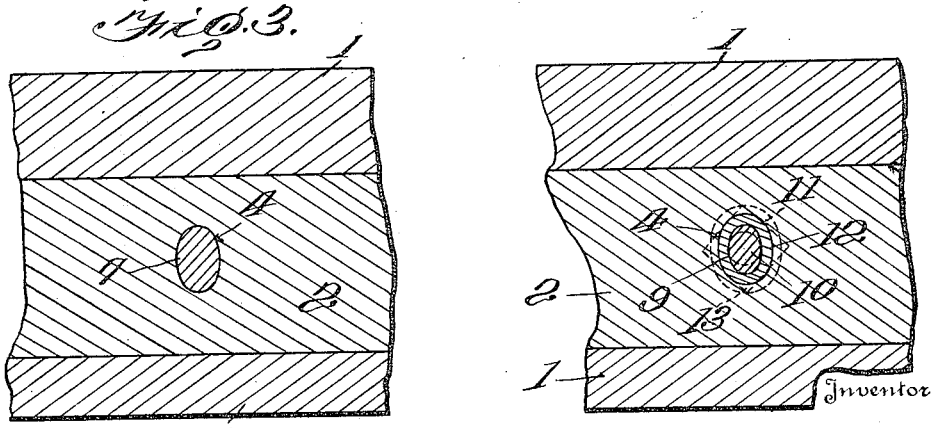

Figs. 3 and 4 are cross sections on line 3—3 and 4—4 respectively of Fig. 1.

1 indicates the railway rail and 2—2 the fish-plate. The rail 1, is provided with the usual hole 3, while the fish-plates 2—2 are provided with elliptical shaped holes 4—4. The bolt comprises a body portion 5, provided at one end with a head 6, and an elliptical portion 7, at the base thereof which is somewhat larger than the body portion. Adjacent to the outer threaded end of the body portion 5, the bolt is flattened as at 9, thereby forming a suitable elliptical portion 10, which is adapted to taper gradually toward the threaded end. Loosely mounted on the bolt adjacent to the outer threaded end, is a locking washer 11, having on its inner side a reduced elliptical shaped extension 12, which is adapted to pass snugly over the elliptical portion 10, of the bolt. This elliptical extension corresponds also in its outer dimensions to the hole 4, in the fish-plate. The elliptical portion at the base of the nut prevents the bolt from turning while the flattened portion of the bolt in turn prevents the locking washer from turning. The face of the washer is provided with an annular series of ratchet teeth 12′.

13 indicates a nut having on its face an annular series of ratchet teeth 14, which are adapted to engage the ratchet teeth 12′, of the lock washer 11, whereby the nut is prevented from turning backward after engaging with the lock washer.

It will thus be seen that I have constructed a combination bolt and nut lock which is of such a construction as to adapt itself to rails and fish-plates of varying thicknesses and one which is complete in its entirety, eliminating the necessity of altering the rail or fish-plate in any manner in order that the bolt may effectively lock itself in fastening them together.

I claim:

1. A nut lock comprising a bolt having an enlarged elliptical portion under its head, a flattened portion adjacent to the threaded end thereof, a lock washer consisting of a disk having annular ratchet teeth on its face and provided on its inner side with an extension adapted to fit the flattened portion of said bolt, and a nut having annular ratchet teeth on its inner face which is adapted to engage the annular ratchet teeth on the lock washer.

2. A nut lock comprising a bolt having an enlarged elliptical portion under its head, a flattened portion adjacent to the threaded end thereof, which tapers gradually toward the outer threaded end of said bolt, said flattened portion being smaller in dimensions than the elliptical portions, a lock washer consisting of a disk having annular ratchet teeth on its face and provided on its inner side with an extension adapted to fit the flattened tapered portion of said bolt, and a nut having annular ratchet teeth on its inner face which is adapted to engage the annular ratchet teeth of the lock washer.

In testimony whereof I affix my signature in the presence of two witnesses.

WILLIAM HUNTER EARY.

Witnesses:
W. S. CAVENDISH,
R. T. DIETZ.

Copies of this patent may be obtained for five cents each, by addressing the "Commissioner of Patents, Washington, D. C."